(12) United States Patent
Julliere

(10) Patent No.: US 7,845,875 B2
(45) Date of Patent: Dec. 7, 2010

(54) LIGHT ARTICULATION BALL-JOINT AND METHOD OF MANUFACTURE OF SUCH A BALL JOINT

(75) Inventor: Benjamin Julliere, Saint Uze (FR)

(73) Assignee: SKF Aerospace France, Saint-Vallier-sur-Rhone (FR)

( * ) Notice: Subject to any disclaimer, the term of this patent is extended or adjusted under 35 U.S.C. 154(b) by 0 days.

(21) Appl. No.: 12/285,569

(22) Filed: Oct. 8, 2008

(65) Prior Publication Data

US 2009/0154990 A1 Jun. 18, 2009

(30) Foreign Application Priority Data

Oct. 9, 2007 (FR) .................................. 07 58159

(51) Int. Cl.
*F16C 11/00* (2006.01)
(52) U.S. Cl. .................... 403/135; 403/139; 403/141
(58) Field of Classification Search ................ 403/139, 403/135
See application file for complete search history.

(56) References Cited

U.S. PATENT DOCUMENTS

| | | |
|---|---|---|
| 5,137,374 A | 8/1992 | Orkin |
| 5,763,106 A | 6/1998 | Blanchard |
| 5,943,941 A * | 8/1999 | Kato et al. .................... 92/12.2 |
| 6,833,018 B1 | 12/2004 | Kosco |

FOREIGN PATENT DOCUMENTS

| | | |
|---|---|---|
| EP | 1 496 277 A | 1/2005 |
| EP | 1 666 628 A | 6/2006 |
| FR | 2 357 777 A | 2/1978 |
| FR | 2 770 597 A | 5/1999 |

OTHER PUBLICATIONS

Sandvik AB: Dormer Information Generale, Article Internet, [online] Extract de L'Internet, XP-002488754 pp. 4-37p, date unknown.

* cited by examiner

*Primary Examiner*—Victor MacArthur
(74) *Attorney, Agent, or Firm*—Dowell & Dowell, P.C.

(57) ABSTRACT

The light articulation ball-joint comprises a metal inner ring and a metal outer ring, provided respectively with a spherical outer surface and a spherical inner surface. The ball-joint also comprises a first contact layer, applied to the spherical surface of one of the rings, and a second contact layer, applied to the spherical surface of the other ring. According to the invention, the first contact layer has a hardness which is less than the hardness of the second contact layer and a thickness which is greater than the thickness of the second contact layer, the first contact layer further being adapted to release particles of solid lubricant by friction with the second contact layer.

8 Claims, 2 Drawing Sheets

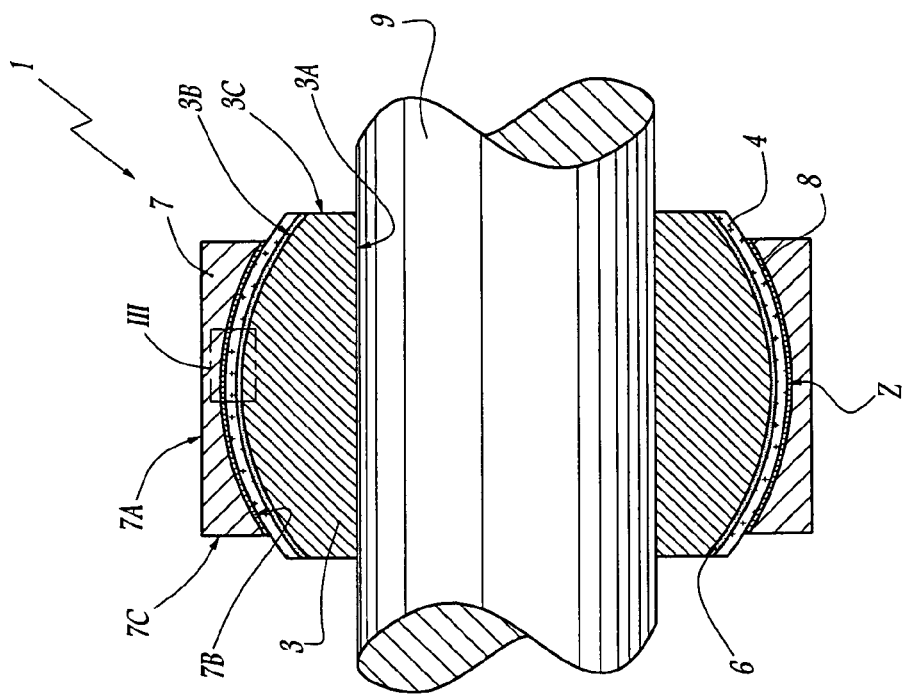
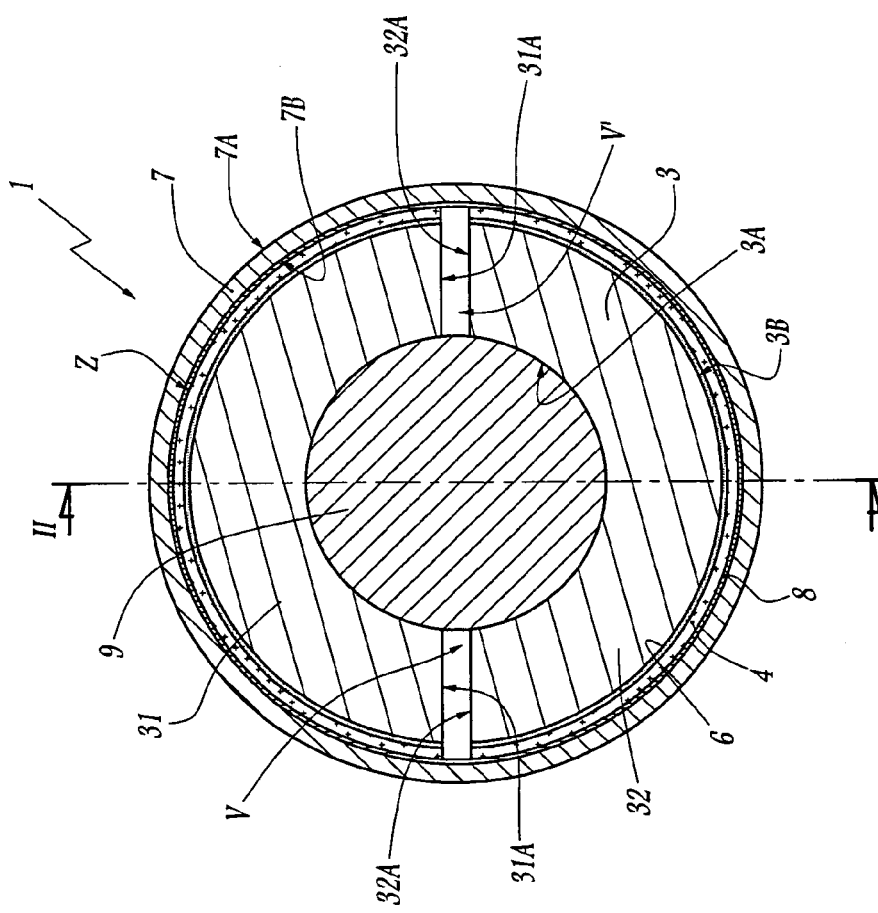

LIGHT ARTICULATION BALL-JOINT AND METHOD OF MANUFACTURE OF SUCH A BALL JOINT

BACKGROUND OF THE INVENTION

1. Field of the Invention

The present invention relates to a light articulation ball-joint and to a method of manufacture of such a ball-joint.

2. Brief Description of the Related Art

In the aeronautics industry it is known to use a metal ball-joint for immobilising two parts, such as a connecting rod and a structural part, in translation relative to each other, while permitting a relative rotational movement of the parts. Such a ball-joint, described for example in FR-A-2 770 597, conventionally comprises a metal inner ring and a metal outer ring. An inner surface of the inner ring is adapted to be mounted on a shaft, while its outer surface is substantially spherical and suitable for co-operating with a corresponding inner surface of the outer ring. The inner ring and the outer ring thus have three mutual degrees of freedom in rotation, while being firmly fixed to each other in translation.

In order to obtain a light metal ball-joint, it is advantageous to form the inner and outer rings of such a ball-joint from a metal or from a metal alloy having a low density. In particular, titanium, titanium alloys, aluminium and aluminium alloys make it possible to produce light rings having a high mechanical strength. However, the frictional behaviour of the aforesaid metals and metal alloys is not compatible with the stresses applied, in operation, to the rings of an articulation ball-joint. The relative movements of the rings when under load are accompanied by friction, which generates wear phenomena due to fretting and to sliding at the contact surfaces of the rings. The degradation of these contact surfaces results in loosening of the ball-joint and an increase in the coefficient of friction at the interface between the rings. In particular, there is a risk that peaks of roughness, present on the rubbing surfaces owing to the effect of wear by fretting, weld to each other, which may, under a high load, lead to complete locking or jamming of the ball-joint.

Light ball-joints comprising inner and outer rings made of titanium alloy are moreover known in which the spherical surfaces are provided with specific coatings, such as very hard thin films, applied to the surfaces of the rings by Physical Vapour Deposition (PVD). These coatings make it possible to improve the frictional properties at the interface between the rings. However, owing to the fact that they are very thin, the coatings have a tendency to be eliminated rapidly during the relative movements of the rings under a high load, and therefore have a limited operating range in terms of contact pressure. When the coating of one of the rings is completely eliminated, the titanium alloy surface of the ring comes into contact with the coating of the other ring. The result of this is rapid degradation of the titanium alloy surface, capable of leading to jamming of the ball-joint, thereby severely limiting the service life of the ball-joint.

It is these drawbacks which the invention is more particularly intended to remedy by proposing a light articulation ball-joint having a stable behaviour in operation and an improved service life.

SUMMARY OF THE INVENTION

To this end, the subject of the invention is a light articulation ball-joint, comprising a metal inner ring and a metal outer ring, provided respectively with a spherical outer surface and a spherical inner surface, the ball-joint comprising a first contact layer applied to the spherical surface of one of the rings and a second contact layer applied to the spherical surface of the other ring, wherein the first contact layer has a hardness which is less than the hardness of the second contact layer and a thickness which is greater than the thickness of the second contact layer, the first contact layer being adapted to release particles of solid lubricant by friction with the second contact layer.

Within the meaning of the invention, by spherical surface there is to be understood a surface formed of at least one portion or a section of a sphere.

According to other advantageous features of the invention:
the first contact layer comprises a metallic matrix and particles of solid lubricant trapped within the matrix;
each ring is made of a metal or of a metal alloy having a density below 7800 kg/m$^3$, preferably below 5000 kg/m$^3$;
each ring is made of titanium, a titanium alloy, aluminium or an aluminium alloy;
the first contact layer has a hardness of between around 100 and 700 Hv, while the second contact layer has a hardness of more than 700 Hv;
the ball-joint comprises an adhesion underlayer interposed between the first contact layer and the ring to which the first contact layer is applied;
the first contact layer comprises a copper alloy matrix having a copper content of at least 50% by weight and particles of solid lubricant, the proportion of particles of solid lubricant in the first contact layer being between around 1 and 30% by weight of the first contact layer;
the first contact layer is applied to the spherical outer surface of the inner ring;
the inner ring is formed of two members, each being substantially C-shaped in cross-section.

The invention also has as its subject a method of manufacture of a ball-joint as described above, comprising the steps of:
depositing the first contact layer on the spherical surface of one of the rings by thermal spraying of a powder comprising particles of solid lubricant;
depositing the second contact layer on the spherical surface of the other ring.

In particular, the second contact layer may be deposited on the spherical surface of the other ring by a process of thin film deposition in a vapour phase (PVD).

BRIEF DESCRIPTION OF THE DRAWINGS

The characteristics and advantages of the invention will become clear from the following description of an embodiment of a light articulation ball-joint according to the invention, provided solely by way of example with reference to the appended drawings, in which:

FIG. 1 is a cross-section of a light ball-joint according to the invention, mounted on a shaft;

FIG. 2 is a section along the line II-II of FIG. 1; and

DESCRIPTION OF THE PREFERRED EMBODIMENT

Figure 5:
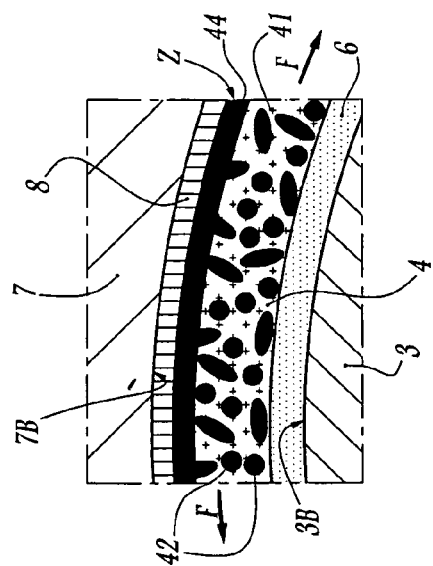
FIGS. 3 to 5 are diagrammatic views on an enlarged scale of the detail III of FIG. 2, showing the development of the contact zone between the first and second contact layers while the light ball-joint is in use.

In FIGS. 1 and 2, the thickness of the layers applied to the rings of the ball-joint has been exaggerated for the sake of clarity of the drawing. In addition, the relative thickness of the second contact layer with respect to the thicknesses of the other layers has been increased in all the drawings, in order to improve its visibility.

The light ball-joint 1 according to the invention shown in FIGS. 1 and 2 comprises an inner ring 3 and an outer ring 7, each made of TA6V titanium alloy. The outer ring 7 has a substantially cylindrical outer surface 7A and a spherical inner surface 7B, more specifically of sections of a sphere, which is connected to the outer surface 7A by lateral walls 7C. The inner ring 3 has a substantially cylindrical inner surface 3A, arranged to be disposed against the outer periphery of a corresponding cylindrical shaft 9, and an outer surface 3B having a spherical profile, more specifically of sections of a sphere, corresponding to that of the inner surface 7B of the outer ring 7. The inner ring 3 and the outer ring 7 thus have three degrees of freedom in rotation relative to each other. As shown in FIG. 2, the inner surface 3A and outer surface 3B of the inner ring 3 are connected to each other by lateral walls 3C which protrude, in axial section, on each side of the lateral walls 7C of the outer ring 7 in the position in FIG. 2, in which the cylindrical surface 7A is coaxial with the shaft 9.

Owing to the low density of the TA6V titanium alloy constituting the rings 3 and 7, the ball-joint 1 has a limited weight. As a variant, each of the inner and outer rings of a light ball-joint according to the invention may be formed of all metal or metal alloy having a density below 7800 kg/m$^3$, preferably below 5000 kg/m$^3$, especially of a titanium alloy other than TA6V, titanium, aluminium or an aluminium alloy.

As shown in FIG. 1, the inner ring 3 according to this embodiment is formed by two complementary members 31 and 32, each being substantially C-shaped in cross-section. As shown in FIG. 1, the members 31 and 32 are symmetrical to each other in relation to a diametral plane of the inner ring 3 perpendicular to the section plane of FIG. 2. The opposed faces 31A and 32A of the members 31 and 32 are flat and separated from each other by a space, so as to define two free volumes V and V', on each side of the shaft 9. For the sake of clarity, the transverse dimension of the volumes V and V' has been exaggerated in FIG. 1. In service, the shaft 9 presses the inner ring 3 against the outer ring 7, such that the presence of the free volumes V and V' has no harmful effect on the mechanical behaviour of the ball-joint 1.

The free volumes V and V' are suitable for receiving a liquid lubricant intended to effect, in operation, the lubrication of the contact surfaces of the inner ring 3 and of the shaft 9, on the one hand, and of the contact surfaces of the inner ring 3 and of the outer ring 7 on the other hand.

The ball-joint 1 also comprises a first and a second contact layer 4 and 8, deposited respectively on the spherical surfaces 3B and 7B of the inner ring 3 and of the outer ring 7. The first contact layer 4 deposited on the surface 3B forms part of the inner ring 3 and forms the contact surface of the ring 3 intended to co-operate with the outer ring 7. Similarly, the second contact layer 8 deposited on the surface 7B forms part of the outer ring 7 and forms the contact surface of the ring 7 intended to co-operate with the inner ring 3.

The contact layers 4 and 8 each have specific properties, adapted to improve the coefficient of friction at the interface between the inner ring 3 and outer ring 7. More specifically, the first contact layer 4, which is applied to the outer surface 3B of the inner ring 3, has a hardness which is less than the hardness of the second contact layer 8 and a thickness which is greater than the thickness of the second contact layer 8. The first contact layer 4 exhibits a regular and predictable pattern of wear as a result of the friction with the second contact layer 8, while the second contact layer 8, which is applied to the inner surface 7B of the outer ring 7, has a high resistance to wear. In particular, the first contact layer 4 has a behaviour favourable to wear, during friction with the second contact layer 8, and this behaviour may be qualified as sacrificial. The first contact layer 4 thus constitutes a preferential wear layer as a result of friction with the second contact layer 8, during the operation of the ball-joint 1.

The first contact layer 4 is moreover adapted to release, as a result of friction with the second contact layer 8, particles of solid lubricant in the zone Z of contact between the contact layers 4 and 8, so as to facilitate sliding at the interface between the contact layers 4 and 8. To this end, the first contact layer 4 comprises a metallic matrix 41 and particles 42 of solid lubricant distributed within the matrix 41. The first contact layer 4 is thus specifically designed to release particles 42 of solid lubricant in the zone Z as the metallic matrix 41 wears because of friction with the second contact layer 8. The metallic matrix 41 of the first contact layer 4 and the second contact layer 8 are adapted so that the matrix 41 exhibits a regular and predictable pattern of wear as a result of the friction with the second contact layer 8.

Advantageously, the hardness of the first contact layer 4, which is less than the hardness of the ring 3 on which it is deposited, is between around 100 and 700 Hv, and the optimum thickness of this first contact layer 4 is between around 20 and 250 μm.

Preferably, the first contact layer 4 comprises a copper alloy 41 as a matrix, having a copper content of at least 50% by weight, and particles 42 of solid lubricant, the proportion of particles 42 of solid lubricant in the first contact layer 4 being between around 1 and 30% by weight of the layer 4.

By way of example, in this embodiment, the first contact layer 4 is a layer having a thickness of 100 μm formed by an alloy of copper, aluminium and iron, the respective contents by weight thereof being 88%±1%, 10%±1%, 2%±1%, to which have been added particles 42 of graphite in a proportion of the order of 30% by weight of the first contact layer 4, as particles of solid lubricant.

As a variant, the first contact layer 4 may comprise any other copper alloy having suitable characteristics such as, by way of example, an alloy of copper and nickel having a respective content by weight of 62%±1%, 38%±1%, an alloy of copper and aluminium having a respective content by weight of 90%±1%, 10%±1%, or an alloy of copper, aluminium, nickel and iron having a respective content by weight of 80%±1%, 10%±1%, 5%+1% and 5%±1%. The graphite particles may also be replaced by any other type of particles 42 of solid lubricant, such as particles of other allotropic varieties of carbon, particles of molybdenum bisulphide $MOS_2$, particles of tungsten bisulphide, particles of silver or particles of boron nitride.

In order to ensure a good metallic bond between the spherical surface 3B of the inner ring 3 and the first contact layer 4, the ball-joint 1 advantageously comprises an adhesion underlayer 6, interposed between the first contact layer 4 and the surface 3B. By way of example, in this embodiment, the adhesion underlayer 6 is a layer having a thickness of 50 μm constituted by a nickel alloy having a nickel content of the order of 55%, such as an alloy of nickel and aluminium or an alloy of nickel, chromium, aluminium and yttrium. Preferably, the thickness of the adhesion underlayer 6 is between around 20 and 200 μm.

Preferably, the adhesion underlayer 6 has a hardness of between around 100 and 700 Hv.

The hardness of the second contact layer 8, which is greater than the hardness of the first contact layer 4, is more than 700 Hv, and the optimum thickness of this second contact layer 8 is between around 1 and 10 μm. Preferably, the difference in hardness between the first contact layer 4 and the second contact layer 8 is more than 350 Hv.

The second contact layer 8 is a coating obtained, by way of example, by thin film vapour phase deposition (PVD). In particular, in this embodiment, the second contact layer 8 is a thin film having a thickness of between around 3 and 8 μm, and having a hardness of more than 1000 Hv.

By way of example, the second contact layer 8 may be a thin film of titanium nitride, chromium nitride or a thin film of nanocomposite of tungsten carbide and carbon (Wc/C), obtained by thin film vapour phase deposition (PVD) and having a hardness of between around 1000 and 2500 Hv. The use of a thin film of nanocomposite of tungsten carbide and carbon (Wc/C) as the second contact layer 8 is particularly advantageous, insofar as this layer has an excellent frictional behaviour because it comprises in particular particles of graphite.

Advantageously, the proportion of particles 42 in the first contact layer 4 is adapted such that the lubrication of the contact zone Z obtained by means of the release of the particles 42 is sufficient to permit satisfactory sliding at the interface between the contact layers 4 and 8. The first contact layer 4, owing to its hardness being less than the hardness of the second contact layer 8, constitutes the preferential and sacrificial wear layer during the use of the ball-joint 1, thereby permitting the gradual release of the particles 42 of solid lubricant as the first contact layer 4 wears. Moreover, since the first contact layer 4 is relatively thick, the safety and longevity of operation of the ball-joint 1 are increased.

Figure 4:
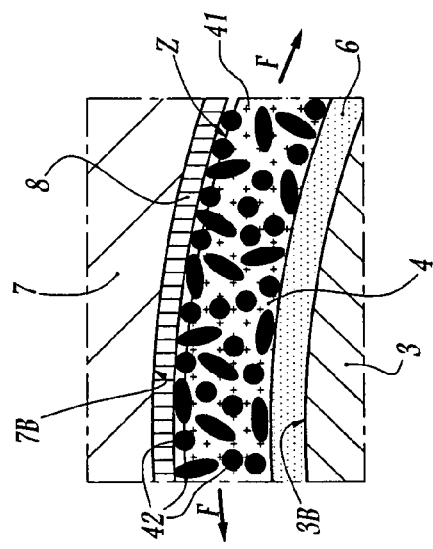
Figure 3:
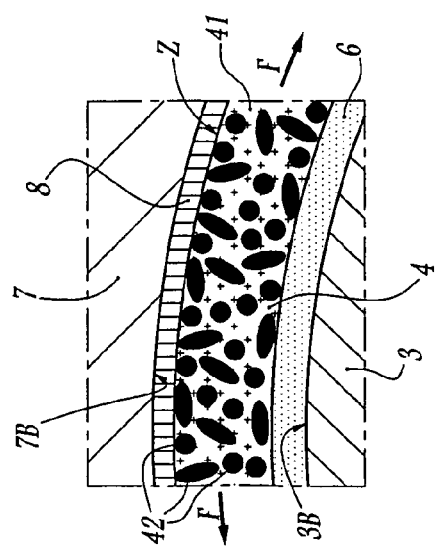

More specifically, as illustrated diagrammatically in FIGS. 3 to 5, the gradual release of the particles 42 of solid lubricant by the first contact layer 4 is obtained as a result of friction between the contact layers 4 and 8 generated by the relative movement of the inner ring 3 and outer ring 7, this movement being shown diagrammatically by the arrows F of FIGS. 3 to 5. The friction between the layers 4 and 8 results in surface wear of the first contact layer 4. The copper alloy matrix 41 of the first contact layer 4 is thus hollowed at the surface and the particles 42 of solid lubricant, initially trapped within the thickness of the matrix 41 of the layer 4, are gradually released. The particles 42 of solid lubricant migrate towards the contact zone Z, to form a film 44 of solid lubricant in this zone, as can be seen in FIG. 5. The particles 42 released in the contact zone Z make it possible, when a liquid lubricant is present, to reduce the coefficient of friction between the layers 4 and 8. The lubrication of the contact zone Z is then effected conjointly by the presence of liquid lubricant and by the release of the particles 42. In addition, in the event of a lack or absence of liquid lubricant during the operation of the ball-joint 1, the particles 42 make it possible to lubricate the contact zone Z and thus facilitate the sliding between the contact layers 4 and 8, the sliding being essential for the operation of the ball-joint 1.

Moreover, it is advantageous for the first contact layer 4 to have a thermal conductivity sufficient to evacuate from the contact zone Z the heat due to friction between the contact layers 4 and 8. Preferably, the first contact layer 4 has a thermal conductivity of more than 30 $W.m^{-1}.K^{-1}$.

A method of manufacture of the ball-joint 1 according to the invention comprises the following steps:

The adhesion underlayer 6 is deposited on the spherical outer surface 3B of the two members 31 and 32 constituting the inner ring 3, then the first contact layer 4 is applied to the surface 3B coated with the adhesion underlayer 6. The deposition of the adhesion underlayer 6 and the deposition of the first contact layer 4 on the surface 3B of the inner ring 3 are each carried out by a thermal powder spraying process, such as a wire arc process, blown arc plasma, HVOF (High Velocity Oxy-Fuel) or HP-HVOF (High Pressure—High Velocity Oxy-Fuel). The deposition of the layers 6 and 4 by thermal spraying is particularly advantageous since it makes it possible to obtain relatively thick layers with a relatively high deposition speed.

More specifically, the adhesion underlayer 6 is formed first by spraying particles of the nickel alloy forming the underlayer 6, in the molten state, onto the outer surface 3B. The first contact layer 4 is then formed, by thermal spraying of a mixture of particles of the copper alloy matrix 41 and particles 42 of solid lubricant, in the molten state, onto the outer surface 3B coated with the adhesion underlayer 6. Once these layers have been deposited, the desired surface shape and state of the first contact layer 4 are obtained by machining, precision grinding and/or lapping the first contact layer 4.

Simultaneously with, prior to or subsequent to the deposition of the layers 6 and 4 on the inner ring 3, the second contact layer 8 is deposited on the inner surface 7B of the outer ring 7, using for example a thin film vapour phase deposition process (PVD).

Owing to the use of metals or metal alloys having low densities to form the inner ring 3 and outer ring 7, the light ball-joint 1 according to the invention has a limited weight, which is particularly advantageous for its use in aeronautical applications. The rings 3 and 7 may in particular be formed of titanium, a titanium alloy, aluminium or an aluminium alloy.

In addition, the light ball-joint 1 exhibits a stable behaviour in operation, owing to the contact layers 4 and 8 applied to the spherical surfaces 3B and 7B of the rings 3 and 7. The properties of the first and second contact layers 4 and 8 are optimised in order, on the one hand, to reduce the phenomenon of wear by friction of the contact surfaces of the rings 3 and 7 capable of leading to jamming of the ball-joint 1, said contact surfaces of the rings being formed by the contact layers 4 and 8, and, on the other hand, to improve the sliding properties at the interface between the rings 3 and 7, so as to maintain the relative sliding of the rings which is essential for the operation of the ball-joint 1.

The second contact layer 8 is thus selected to have a high level of hardness and a strong resistance to wear, while the first contact layer 4, comprising in particular a matrix constituted of copper alloy, is selected to have a lower level of hardness and a gradual and predictable pattern of wear as a result of friction with the second contact layer 8. The first contact layer 4 thus forms the preferential wear layer during the operation of the ball-joint 1 and imparts an accommodating and sacrificial character to the contact between the rings 3 and 7. Owing to the high resistance to wear of the second contact layer 8 and to the regular wear of the first contact layer 4 during the operation of the ball-joint, the risk of the appearance of phenomena of fretting and transfer of material between the contact surfaces of the rings 3 and 7, which are formed by the contact layers 4 and 8, and of jamming of the ball-joint 1 is substantially reduced. In addition, since the first contact layer 4 is relatively thick, preferably between around 20 and 250 μm, the ball-joint 1 according to the invention has an improved service life compared with the light ball-joints of the prior art.

Owing to the gradual release of the particles 42 of solid lubricant by the first contact layer 4 during the operation of the ball-joint 1, the sliding properties between the rings 3 and 7 are also optimised. The release of the particles 42 by the first contact layer 4 as a result of friction with the second contact layer 8 makes it possible, in combination with the optional presence of liquid lubricant between the contact layers 4 and 8, to provide permanent lubrication of the contact zone Z between the rings 3 and 7. As will appear from the previously described method of manufacture of the ball-joint 1, the integration of the particles 42 of solid lubricant into the metal alloy matrix of the first contact layer 4 is easily brought about during the thermal spray deposition of the layer 4 on the ring 3.

Moreover, the construction of the inner ring 3 in the form of two members 31 and 32 of C-shaped cross-section makes the deposition of the first contact layer 4, which is the preferential wear layer, on this inner ring particularly advantageous. Indeed, it is easy to replace such a two-part inner ring, when it is worn, with a new two-part inner ring, without having to disassemble or replace the outer ring 7, which is subject to less wear.

The invention is not limited to the example described and shown. In particular, according to a variant of the invention which is not shown, the adhesion underlayer, intended to improve the metallic bond between the first contact layer and the surface of the ring to which that contact layer is applied, may be omitted.

According to another variant of the invention which is not shown, the inner ring of a light ball-joint according to the invention may be of one-piece construction and not formed of two members. In addition, the first contact layer may be applied to the inner surface of the outer ring instead of the outer surface of the inner ring, the second contact layer then being applied to the outer surface of the inner ring. However, as explained previously, when the inner ring of a light ball-joint according to the invention is formed of two members of C-shaped cross-section, it is particularly advantageous to deposit the first contact layer, which is the preferential wear layer, on the inner ring, such that it is easily possible to replace a worn inner ring with a new inner ring without modification of the outer ring.

The invention claimed is:

1. A light articulation ball-joint (1), comprising: a metal inner ring (3) and a metal outer ring (7), provided respectively with a spherical outer surface (3B) and a spherical inner surface (7B), the ball-joint further comprising a first contact layer (4) applied to the spherical surface of one of the rings and a second contact layer (8) applied to the spherical surface of the other ring, wherein the first contact layer (4) has a hardness which is less than the hardness of the second contact layer (8) and a thickness which is greater than the thickness of the second contact layer (8), the first contact layer (4) being adapted to release particles (42) of solid lubricant by friction with the second contact layer (8).

2. A ball-joint according to claim 1, wherein the first contact layer (4) comprises a metallic matrix (41) and particles (42) of solid lubricant trapped within the matrix (41).

3. A ball-joint according to claim 1, wherein each ring (3, 7) is made of a metal or a metal alloy having a density below 7800 kg/m$^3$, preferably below 5000 kg/m$^3$.

4. A ball-joint according to claim 1, wherein each ring (3, 7) is made of titanium, a titanium alloy, aluminium or an aluminium alloy.

5. A ball-joint according to claim 1, wherein the first contact layer (4) has a hardness of between around 100 and 700 Hv, while the second contact layer (8) has a hardness of more than 700 Hv.

6. A ball-joint according to claim 1, wherein the first contact layer (4) includes a copper alloy matrix (41) having a copper content of at least 50% by weight and particles (42) of solid lubricant, the proportion of particles (42) of solid lubricant in the first contact layer (4) being between around 1 and 30% by weight of the first contact layer (4).

7. A ball-joint according to claim 1, wherein the first contact layer (4) is applied to the spherical outer surface (3B) of the inner ring (3).

8. A ball-joint according to claim 7, wherein the inner ring (3) is formed of two members (31, 32) each being substantially C-shaped in cross-section.

* * * * *